(12) United States Patent
Kryzak

(10) Patent No.: US 11,138,531 B1
(45) Date of Patent: Oct. 5, 2021

(54) METHOD AND SYSTEM OF PLANNING AND SCHEDULING THAT INCORPORATES INHERITANCE, FEEDBACK LEARNING, PATH OPTIMIZATION, AND SIMULATION

(71) Applicant: Aligned Services, Inc., San Jose, CA (US)

(72) Inventor: Joe Kryzak, San Jose, CA (US)

(73) Assignee: Aligned Services, Inc., San Jose, CA (US)

( * ) Notice: Subject to any disclaimer, the term of this patent is extended or adjusted under 35 U.S.C. 154(b) by 628 days.

(21) Appl. No.: 14/210,088

(22) Filed: Mar. 13, 2014

(51) Int. Cl.
*G06Q 10/06* (2012.01)
*G06F 16/901* (2019.01)
*G06Q 10/10* (2012.01)

(52) U.S. Cl.
CPC . *G06Q 10/063118* (2013.01); *G06F 16/9024* (2019.01); *G06Q 10/103* (2013.01)

(58) Field of Classification Search
None
See application file for complete search history.

(56) References Cited

U.S. PATENT DOCUMENTS

| | | | | |
|---|---|---|---|---|
| 5,381,332 A | * | 1/1995 | Wood | G06Q 10/06315 705/7.25 |
| 6,063,128 A | * | 5/2000 | Bentley | G06F 9/4493 703/6 |

(Continued)

OTHER PUBLICATIONS

Stover, Teresa. Microsoft Office Project 2003 Inside Out. Microsoft Press, 2003. ch. 2-4, 7, 9-11, 19-23, and 32.*

(Continued)

*Primary Examiner* — Jerry O'Connor
*Assistant Examiner* — Abhijit B Sadananda
(74) *Attorney, Agent, or Firm* — Neal Marcus

(57) ABSTRACT

Embodiments disclose a system and method for planning and scheduling, comprising connecting a single or plurality of similar computer systems via a local, private, or public network, creating or instantiating a plan a plan or plans, wherein the said plan is comprised within a tackle, and wherein the plan comprises a single or plurality of recursive child plans, allowing for organization, linking, interfacing and inheritance of a plurality of plans, a single or plurality of items, and for organization, linking, interfacing and inheritance of said items, performing an operation or operations on each item wherein each item can be broken up, perfected, integrated, or tackled, and wherein the encoded instructions further cause the computer system to request assignment through a series of assigning users, with the final assigning user assigning the first item for a first user who commits to the assignment of the first item; wherein the first user commits to constructing the item by providing a commitment duration range of time becoming the assigned user; delivering the constructed item by the assigned user to one or more receiving users; each receiving user accepting and rejecting the constructed item by the assigning user; and the system recording and storing critical analytics with respect to construction of the assigned item and its' delivery relative to the specified duration range; with an ability to modify given protocol between users on demand.

4 Claims, 16 Drawing Sheets

(56) References Cited

U.S. PATENT DOCUMENTS

| | | | | |
|---|---|---|---|---|
| 6,138,104 | A * | 10/2000 | Marchak | G06Q 10/04 700/97 |
| 7,117,162 | B1 * | 10/2006 | Seal | G06Q 10/06 705/7.15 |
| 7,266,502 | B2 * | 9/2007 | Robins | G06Q 10/06 281/16 |
| 7,792,875 | B2 * | 9/2010 | McKeough | G06F 16/22 707/803 |
| 8,000,992 | B1 * | 8/2011 | Marchbanks | G06Q 10/0631 705/7.12 |
| 2001/0027406 | A1 * | 10/2001 | Araki | G06Q 10/06311 705/7.16 |
| 2001/0052108 | A1 * | 12/2001 | Bowman-Amuah | G06Q 10/06 717/100 |
| 2002/0184250 | A1 * | 12/2002 | Kern | G06Q 10/06 |
| 2003/0033191 | A1 * | 2/2003 | Davies | G06Q 10/06 705/7.14 |
| 2003/0110067 | A1 * | 6/2003 | Miller | G06Q 10/06 705/7.23 |
| 2003/0188290 | A1 * | 10/2003 | Corral | G06Q 10/06 717/101 |
| 2006/0010024 | A1 * | 1/2006 | Eguchi | G06Q 10/063114 705/7.15 |
| 2006/0044307 | A1 * | 3/2006 | Song | G06Q 10/06 345/419 |
| 2006/0206367 | A1 * | 9/2006 | Baker | G06Q 10/06 705/7.17 |
| 2008/0059123 | A1 * | 3/2008 | Estberg | G06Q 10/06 702/188 |
| 2008/0163156 | A1 * | 7/2008 | Grey | G06F 8/24 717/101 |
| 2009/0125128 | A1 * | 5/2009 | Eldridge | G05B 15/02 700/86 |
| 2009/0125359 | A1 * | 5/2009 | Knapic | G06F 9/542 705/7.23 |
| 2010/0017252 | A1 * | 1/2010 | Chaar | G06Q 10/06 705/7.12 |
| 2010/0082497 | A1 * | 4/2010 | Biesemann | G06Q 10/06 705/301 |
| 2010/0083239 | A1 * | 4/2010 | Chouinard | G06F 8/20 717/137 |
| 2010/0174579 | A1 * | 7/2010 | Hughes | G06Q 10/06311 705/7.13 |

OTHER PUBLICATIONS

Chandrashekar, K.R. "Object-Oriented Project Management (O2PM) Objectizing Work." ProjectManagement.com, Jun. 24, 2010, <https://www.projectmanagement.com/articles/283578/Object-Oriented-Project-Management-O2PM-Objectizing-Work>. (Year: 2010).*

Khan, Emdad H., et al. "The Effect of OO Life Cycle on Software Project Management." IEMC 96: International Conference on Engineering and Technology Management, Managing Virtual Enterprises: A Convergence of Communications, Computing, and Energy Technologies, 1996, pp. 233-240. (Year: 1996).*

\* cited by examiner

METHOD AND SYSTEM OF PLANNING AND SCHEDULING THAT INCORPORATES INHERITANCE, FEEDBACK LEARNING, PATH OPTIMIZATION, AND SIMULATION

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention is in the field of social planning. More particularly, the present invention is in the technical field of managing and optimizing the production of constructed items, in terms of time to market, cost and quality For much of civilized history, humankind has engaged upon large and complex projects requiring the inputs of many individuals in order to achieve. It since became apparent that when scheduling projects, X working individuals do not often lead to X times improvement in project completion time. Rather, experience has taught that for a project to be completed, a good deal of resource planning, scheduling and dedicated resources allocated as project managersare required in order to make efficient use of available resources.

Varying methodologies attempting to plan the proper order with which work was to be performed came about. In particular, the twentieth century brought about numerous mathematically rigorous methodologies that sought to optimize the scheduling of complex projects. Some of the better know methodologies so developed include: 1) Arrow diagramming method; 2) Critical-path method; 3) Gantt charts; 4) Precedence Diagram Method (PDM); and 5) Program Evaluation and Review Technique (PERT).

Each of these techniques is somewhat different. At their core, however, they share a similar methodology and theoretical underpinning. That is, the techniques break a proposed complex piece of work into several smaller and simpler constituent elements of work. The processes then next analyze what elements must occur prior to work commencing on other elements. The analyses result in a series of individual work elements, commonly referred to as 'nodes' that are then organized in such a manner that the order by which the work will be performed is logically achievable. Once the work elements have been so organized, a network optimization algorithm is performed that determines the best order in which to perform the work. The algorithms make use of shortest path network analysis and work recursively until the best outcome is found.

By way of example, if one were to construct a wood-frame house with a concrete foundation, a project scheduler would break the process into a few basic steps. First, a large hole would need to be excavated where a foundation could be poured. Next, a carpentry team would need to prepare the formwork to support a concrete pour. A concrete crew would next need to lay the concrete and form the actual foundation. Only once all three of these steps were completed, would it then make sense to start building the actual house.

A project scheduler, using one of the above methods would show four nodes and place them in the order of 1) excavate; 2) carpentry team; 3) concrete; 4) house construction. Within each of these four steps, the scheduler would then further break each step into smaller work steps. So in the above example, a scheduler might find that the carpentry team could build much of the formwork at the same time that the excavation crew was also digging. Once the excavation crew was completed, the carpentry team could then move its formwork into the new hole. Similarly, the house construction team could order plumbing pipes, electrical wiring, lumber, and the like while the concrete was being poured and later drying. The idea is to always have as many resources productively working in parallel so as to achieve optimal throughput.

The scheduling methodologies above did a good job helping many industries better manage complex projects. The techniques themselves were implemented by hand, paper-based charting methods, chalk and whiteboards, and then later by computer software.

The Internet, globalization, air travel, world economies, and technology have and continue to make it ever more possible for humankind to pursue and individually participate in increasingly complex projects. The scheduling methodologies above, while impressive, are also lacking in several areas. Most significantly, the methods are wonting with respect to 1) relative rigidity as to what constitutes a unit of work with which to schedule; 2) limited ability to revise and enhance based upon prior performance and learning's, and 3) inadequate user interaction to optimize and plan work subsections on a piecemeal basis.

SUMMARY

The present invention relates in general to a computer automated system and method for the efficient scheduling of resources.

The subject matter discussed in the background section should not be assumed to be prior art merely as a result of its mention in the background section. Similarly, a problem mentioned in the background section or associated with the subject matter of the background section should not be assumed to have been previously recognized in the prior art.

An embodiment of the invention utilizes what will henceforth be termed 'Item'. An item is a quantum of schedulable activity. An item may designate a deliverable activity output, an intermediate activity output, or a requisite activity element.

Defining, or creating, an item is an action that is performed by a user of the system and that requires a certain amount of time to be completed.

One embodiment of the invention allows participants within a community of practice to create Item(s) efficiently and of high quality. The embodiment system provides real time status to users and informs the user to what extent a project is delivered, is completed, and still remains in progress. The embodiment system provides such status information at the project level and also at the complex Item(s) and individual Item(s) levels. That is, the system provides the user with a means to access these status data and to both drill down ('zoom in') and to collapse up ('zoom out') to a level or granularity for which the user desires such information.

Embodiments disclosed further provide predictive information which gains accuracy with repeated use. That is, the system regularly provides updated information to users, who then further update the information, this modified information is then fed back into the system and the information cycle then repeats itself in an ongoing manner. By so doing, the system provides increasingly accurate predictive calculations. Predictive calculations include, but are not limited to, likelihood of achieving milestone dates.

One embodiment of the invention allows participants within a community of practice to create Plan(s) efficiently and of high quality. The planning mechanism allows for real time adaptation, reuse and annotation of complex objects and workflows.

One embodiment of the invention allows participants within a community of practice to interact regarding time, cost and quality constraints using items as a conduit. This allows organizations to construct custom workflows around the items to monitor constraints in real time.

One embodiment of the invention allows participants within a community of practice to construct plans using object oriented constructs such as classes, instances, and inheritance. By using these constructs, individuals have the same flexibility in constructing plans that computer scientists have in constructing programs.

One embodiment of the invention allows participants within a community of practice to work within a continuous build environment. As plans and associated metadata are created and updated, plan and project status is updated real time to reflect changes. This is different than the classic computer science model, which requires a sequential design, compile, debug/binary steps, which is then simulated to create results which are then analyzed.

Embodiments disclose a dynamic system of a continuous build environment, such that as soon as the first design element is placed, analytics are already produced in real time, with the compile and simulation steps occurring in the back ground. As in a normal design process, if the user interaction results in an error to the system, the user is immediately notified in real time. This is in contrast with systems that do not have real time compilation.

An embodiment includes a computer automated system for planning and scheduling, comprising a processing unit coupled to a memory element and having instructions encoded thereon, wherein the encoded instructions cause the system to: connect to a single of plurality of similar computer systems via a local, private, or public network; and wherein the encoded instructions cause the single or plurality of computer systems to: create or instantiate a plan, wherein the said plan is comprised within a tackle, and wherein the plan comprises a single or plurality of recursive child plans, allowing for organization, linking, interfacing and inheritance of a plurality of plans, a single or plurality of items, and for organization, linking, interfacing and inheritance of said items; perform an operation or operations on each item wherein each item can be broken up, perfected, integrated, or tackled; and wherein the encoded instructions further cause the computer system to: request assignment through a series of assigning users, with the final assigning user assigning the first item to a first user who commits to the assignment of the first item; wherein the first user commits to constructing the item by providing a commitment duration range of time, becoming the assigned user; deliver the constructed item by the assigned user to one or more receiving users; accept or reject the delivered constructed item by the one or more receiving users; record and store critical analytics with respect to construction of the assigned item and its' delivery relative to the specified duration range; and modify given protocol between users.

Another embodiment includes, in a computer automated system comprising a processing unit coupled to a memory element and having instructions encoded thereon, and connected to a single or plurality of similar computer systems over a network, a method for planning and scheduling, comprising: allowing the creation or instantiation of a plan, wherein the said plan is comprised within a tackle, and wherein the plan comprises a single or plurality of recursive child plans, and further allowing for the organization, linking, interfacing, and inheritance of said plans, and organization, linking, interfacing and inheritance of a single or plurality of items; performing an operation or operations on each item wherein each item can be broken up, perfected, integrated, or tackled; and wherein the method further comprises: requesting assignment through a series of assigning users, with the final assigning user assigning the first item for a first user who commits to the assignment of the first item; wherein the first user commits to constructing the item by providing a commitment duration range of time, becoming the assigned user; delivering the constructed item by the assigned user to one or more receiving users; accepting or rejecting the delivered constructed item by the one or more receiving users; recording and storing critical analytics with respect to construction of the assigned item and its' delivery relative to the specified duration range; and modifying given protocol between users.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

DETAILED DESCRIPTION OF THE PREFERRED EMBODIMENT

Figure 1:
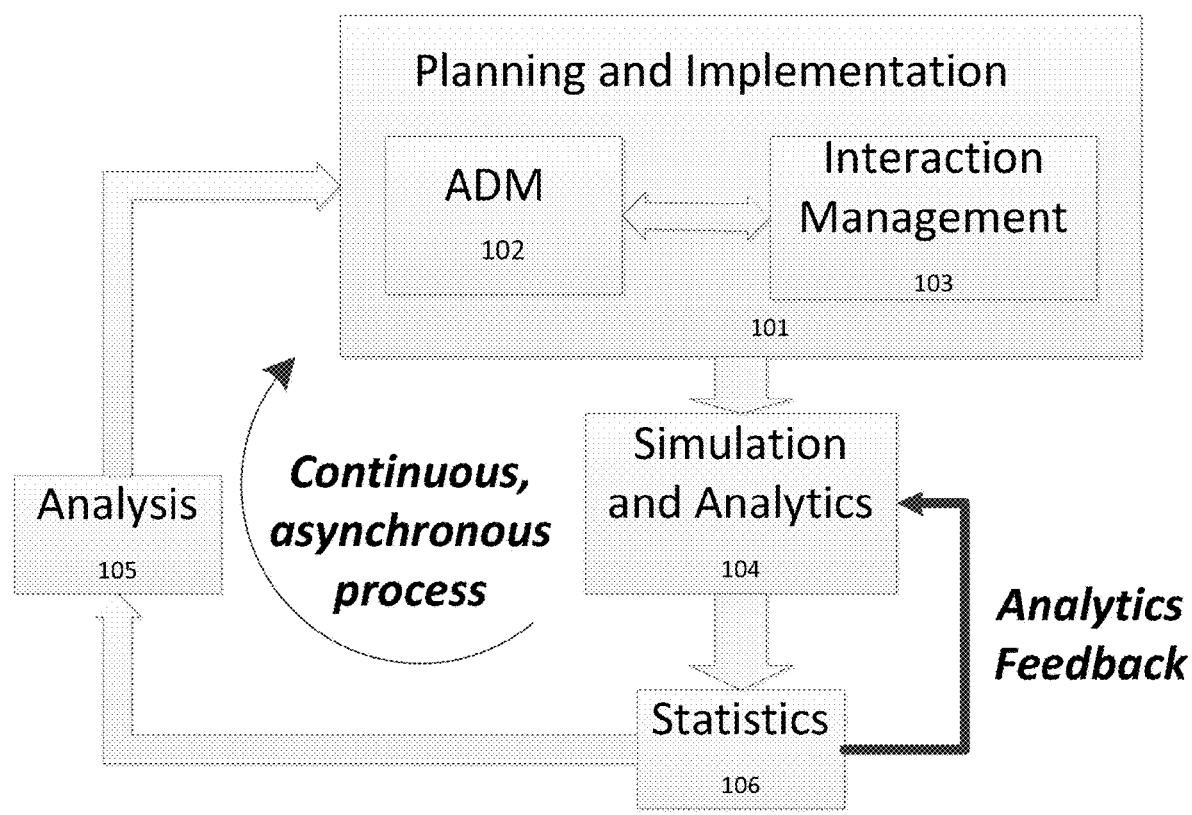
FIG. 1 shows a block diagram of the Aligned System Workflow (ASW) implementing the present invention.

The following terms have these corresponding definitions in the description:

ADM—Aligned Diagramming Method. A modification of the PDM that allows for Compliance, Inheritance, Interfacing and Composition of Plans.

Aligned—IS_THIS_A_TRADE_NAME_OTHER

APE—Aligned Plan Equivalents

ASW—Aligned System Workflow

Base Methodology—Workflow between users utilizing assignments, commitments, delivery events, accept/reject feedback, and abandonment of current state.

Canvas—The drawing field in which plans are implemented.

Class—equivalent to a standard Class definition in computer science.

Compliance—defined as a plan or set of plans that are used as the base class for subsequently subclasses ('perfected') plans. Compliance is established if all the items in the base class are delivered with expected quality.

Interfacing—defined as the properties, items, and actions that describe a plan or item. Interfacing can apply in terms of an item or a plan. Multiple interfaces can be applied to a plan or plans, item or items.

Composition/Aggregation—plans may contain other plan instances.

Deliverable—An item that is the source of an edge which sinks to another item

Duration—the range of time used to set expectations about when an item will be delivered Edge—An arrow connecting two Items, indicating a dependency whereby the Item that is connected to the arrow's nock must precede and complete prior to commencement of the Item that is connected to the arrow's broad head.

Entity—The person or machine that delivers the item. Duration range estimations are not limited to human beings. Plans may be constructed and items may be added by artificial intelligence.

GID—General Item Decomposition

Global Server—The servers hosted by aligned.com. This is relevant when speaking about protecting intellectual property. Imagine a semiconductor company delivering to a silicon foundry for manufacture of the ASIC or IC. The details of the ASIC/IC are incredibly complex and proprietary. The foundry is only interested in the files used for layout of the silicon structure. The semiconductor company can upload the item to the aligned.com Global Server that references the layout of the silicon, and have the rest of the proprietary items stored on their local VPN. The item on the Global Server is linked to the item behind the VPN, so that as the schedule slips internally or speeds up within the semiconductor company, the foundry is automatically notified, because the semiconductor company has given access to the item and it's data to the foundry. The Global Server acts as a 'central' or 'common' meeting point between one or more companies.

Inheritance—Sub-classing a plan to create a new plan. The resultant plan contains all items and plans of the base plan.

Interaction Management—Mechanism used to store behaviors about individuals with the purpose of using the data as a future predictor. The Interaction Management is configurable; a base methodology is given as an example.

Intermediate Deliverable—an item that has both source and sink edges leading from it.

Item—A container class in the ADM PSND used to indicate a deliverable, an intermediate deliverable, or a required element.

Item Instance—A specific instance of an item place inside of a plan. The Item Instance stores complex data related to implementation of the item, and interaction with other members of the community of practice.

Item Type—Using item as a Class, corresponds to the Class name of the Item.

Local Server—A server located within a VPN or local computer, characterized as not accessible by the Internet for privacy concerns.

Netlist—a representation of the full project plan

Netlist Plan (Routing)

PDM—Precedence Diagramming Method

Plan.—A container class used to store items and dependencies in the ADM.

Plan Instance—A specific instance of a Plan placed in a Plan or a Tackle.

PMBOK—Project Management Book of Knowledge

Community of Practice —a group of people who share a craft and/or a profession. The group can evolve naturally because of the members' common interest in a particular domain or area, or it can be created specifically with the goal of gaining knowledge related to their field. It is through the process of sharing information and experiences with the group that the members learn from each other, and have an opportunity to develop themselves personally and professionally PSND—Project Schedule Network Diagram PSTN—Project Schedule Network Template, from PMBOK guide, Third Edition, Page 133. Drawn with a definite begin and end, as opposed to the PSND which is considered an elemental object.

Real Time—determined as when a cause in the system due to user interaction results in an effect in the system that can be measured within an acceptable amount of time for business or scientific purposes.

Required Element—A type of item that is used in plans that are subclassed. These required elements are used to create checklists for compliance. If a set of required elements have been satisfied from parent plans through inheritance, the plan is considered in compliance.

Tackle—a container environment consisting of a canvas used to draw PSNDs in the ADM, and a mechanism to continually build, simulate and implement a given set of Plan instances.

Those skilled in the art will appreciate that the present invention may be implemented with many different types of computer system configurations, including hand-held devices, multiprocessor systems, microprocessor based or programmable consumer electronics, network personal computers, minicomputers, mainframe computers, and the like. Those skilled in the art will also appreciate that a subset of the present invention may be implemented to focus the user on relevant information without any loss at the system level. The present invention can also include multiple computer programs which embody the functions described herein and illustrated in the drawings and flow charts. It should also be apparent that there could be many different ways of implementing the invention through computer programming; the invention should not be construed as limited to any one set of computer program instructions. Further, a skilled programmer, without difficulty, could write such a computer program to implement the disclosed invention based upon the drawings, flow charts, programming logic and associated description in this Application.

FIG. 1 shows a block diagram of the Aligned System Workflow implementing an embodiment of the present invention. The Aligned System Workflow comprises a planning and implementation module 101, which further comprises a module that facilitates the Aligned Diagramming Method (ADM) 102. The Aligned Diagramming Method is a modification of the Precedence Diagramming Method (PDM) that allows for Compliance, Inheritance and Composition of Plans. The planning and implementation module further comprises an interaction management module 103 wherein the interaction management module and the ADM module are capable of uni and bi-directional communication/interaction. After planning and implementation, the system facilitates simulation and analytics of the planned implementation via a simulation and analytics module 104. Statistics module 106 performs statistical generation of data based on the simulation and analytics performed in module 104. And analysis module 105 facilitates analyzing of the results obtained from the statistics module. A client user can login to a server, which then provides a client interface. The user may enter into the workflow at any point of entry. Most users will be classified as contributors to the project and will start in the planning and implementation section. Users who are considered executive may start in analytics or statistics and only provide feedback in the form of analysis.

Figure 2:
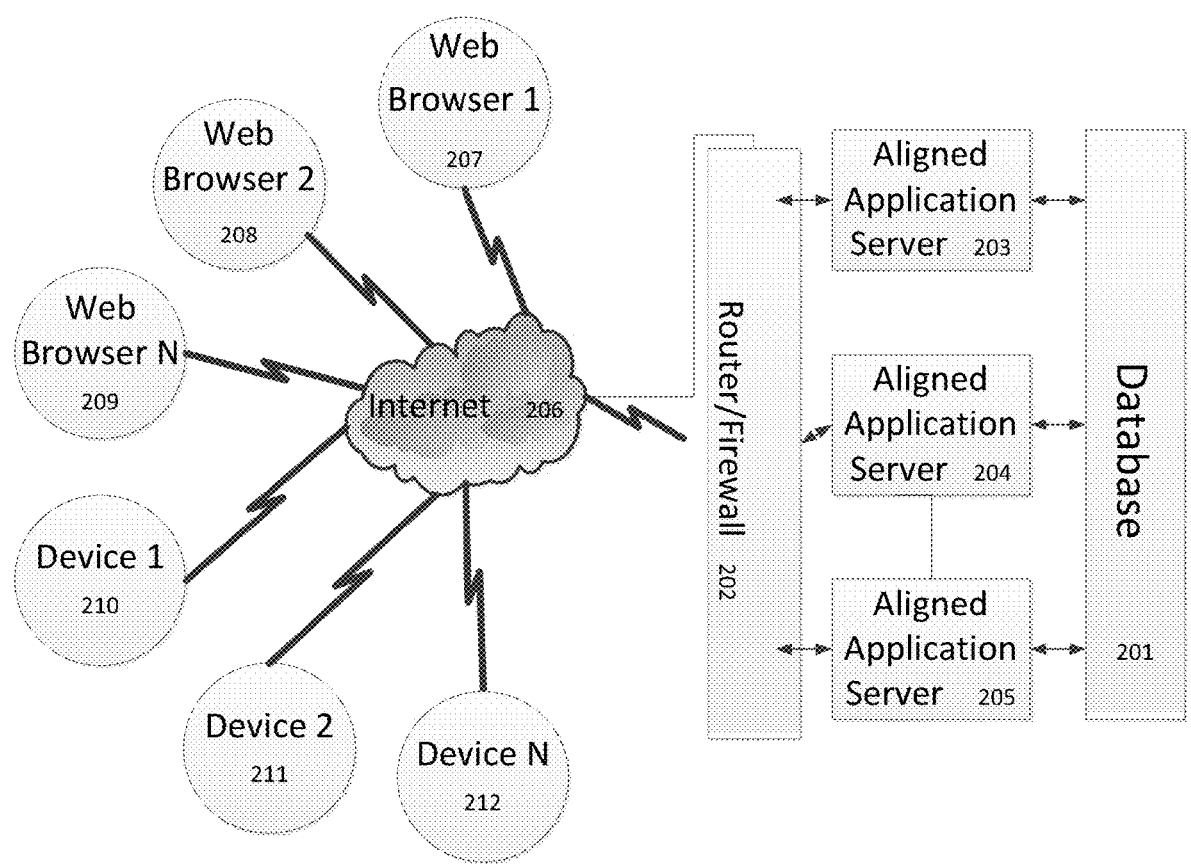
FIG. 2 shows a block diagram of Aligned Client and Server network topology.

FIG. 2 shows a block diagram of the Aligned Server/Client relationship. Preferably, there is no limit to the number of users that can contribute to the Aligned System, and neither is there a restriction on the type of device used. As shown, multiple users may operate via multiple web based browsers (207, 208, 209), or/and multiple devices (210, 211, 212) including mobile devices, or any access point for the Internet with computational capability through devices already invented or yet to be invented. The user begins the experience by registering as a user, which allows him or her to be authenticated by the system, and determine proper authorizations. Once the user logs in, he or she has access to their items, as well as any items they have been given access to. Embodiments allow operating through a web browser or other device, and communication over a network such as the Internet 206, through a router firewall 202, wherein users may access multiple application servers (203, 204, and 205) and database 201.

Figure 3:
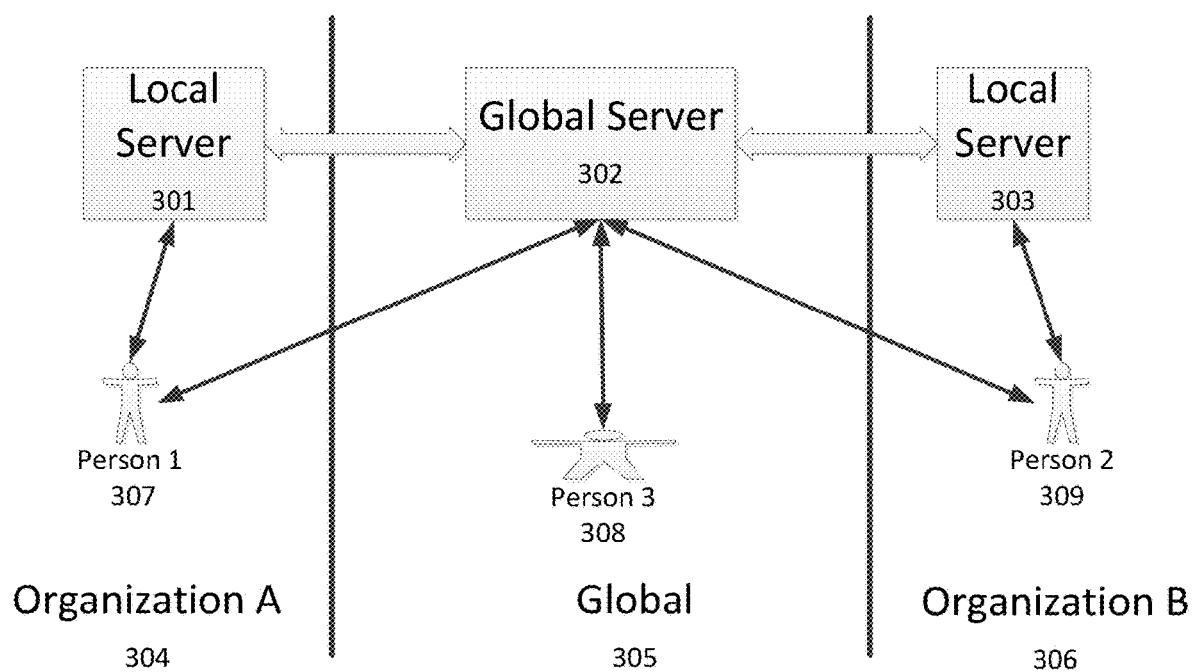
FIG. 3 shows a block diagram of a Global and Local Server network topology.

FIG. 3 shows via a block diagram, global and local server relationships in organizations. Preferred embodiments of the Aligned System include the capability to isolate data that is relevant to an individual or organization. According to an embodiment, a computer automated system comprises a processing unit coupled to a memory element having thereon encoded instructions that cause the system to identify and isolate relevant data. The encoded instructions further allow access to a Global Server 302 by every user in the Aligned System. For example, say organization A 304 has intellectual property worth protecting. In such a scenario, Organization A installs a local server 301 behind their firewall. Only those given access by Organization A can access the local server 301 within Organization A's firewall. However, say Person 1 307, who has been given access to Organization A's local server, can still access the Aligned Global Server 302. This allows Person 1 to share critical deliverables with Person 2 309, through the Global Server. Person 3 308 is shown, who has access only to the Global Server, and may or may not see A's critical deliverables based on the access given by Person 1 to Person 3. The servers communicate with each other to synchronize user accounts and password tables. Object transfer is handled through the client side through Person 1 in this case.

Preferred embodiments of the Aligned System include a unique plan entry methodology that allows for composition, inheritance and compliance. The Aligned System planning methodology is based on the Precedence Diagramming Method. However, the limitations of the Precedence Diagramming Method are many, and the Aligned System overcomes these limitations through the Aligned Diagramming Method.

Figure 4:
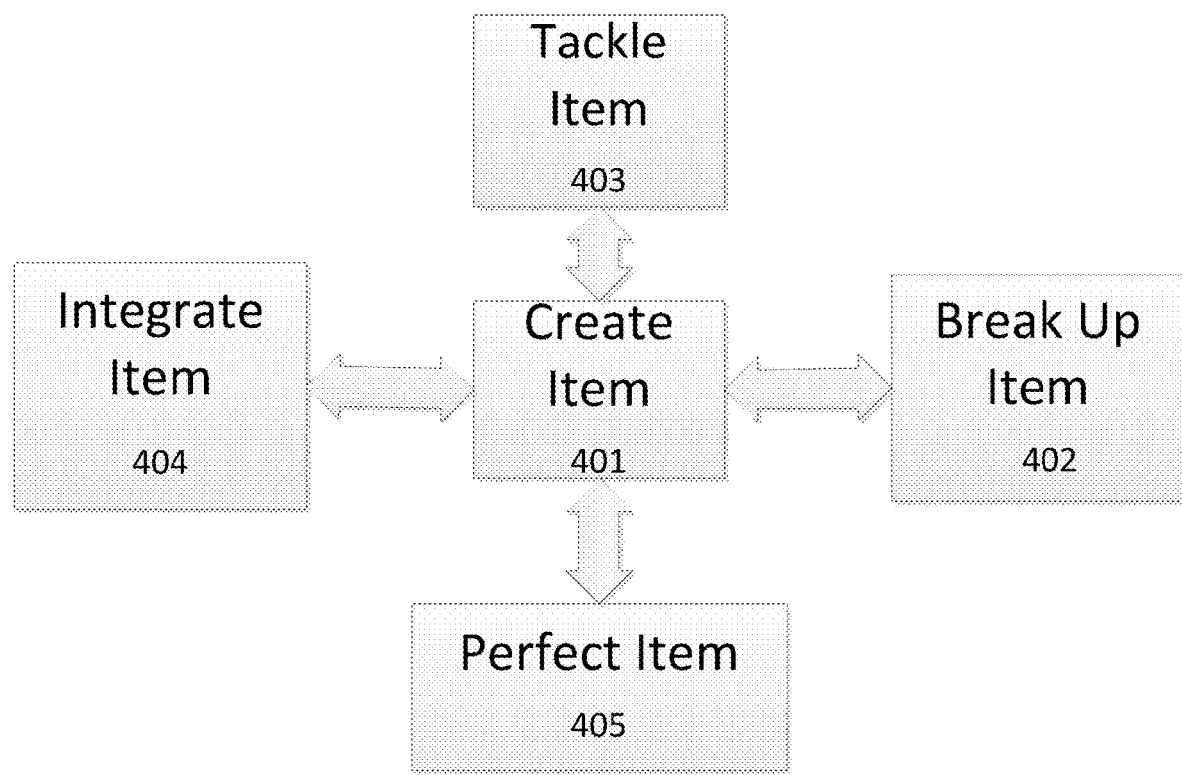
FIG. 4 shows a block diagram of allowable operations on an Item.

FIG. 4 shows a block diagram of operations on an item. FIG. 4 illustrates how an item once entered into the system can have several operations applied to it. The item can be broken up (402), which is similar to software composition. For example (say) a pencil may be broken up into an eraser and a wooden shaft with lead. The item may be perfected (405), which means that the original item is abstract enough such that a finer description can take place. For instance, by entering an item named cookie, I can perfect that item to create (401) an item called Oreo, which is still a type of cookie and linked back to the cookie item. This is analogous in software to inheritance. The item can be integrated (404) into a plan, which is analogous to software composition, wherein plan has many items. Finally, the item can be tackled (403), which means that it's being simulated in an actual project, and contains temporal information as well as resource information. By repeating this process recursively with recursive plans, very complex structures can be created. Additionally new structures can be created on top of already created complex structures, and further recreation of already created complex structures is made simple.

Figure 5:
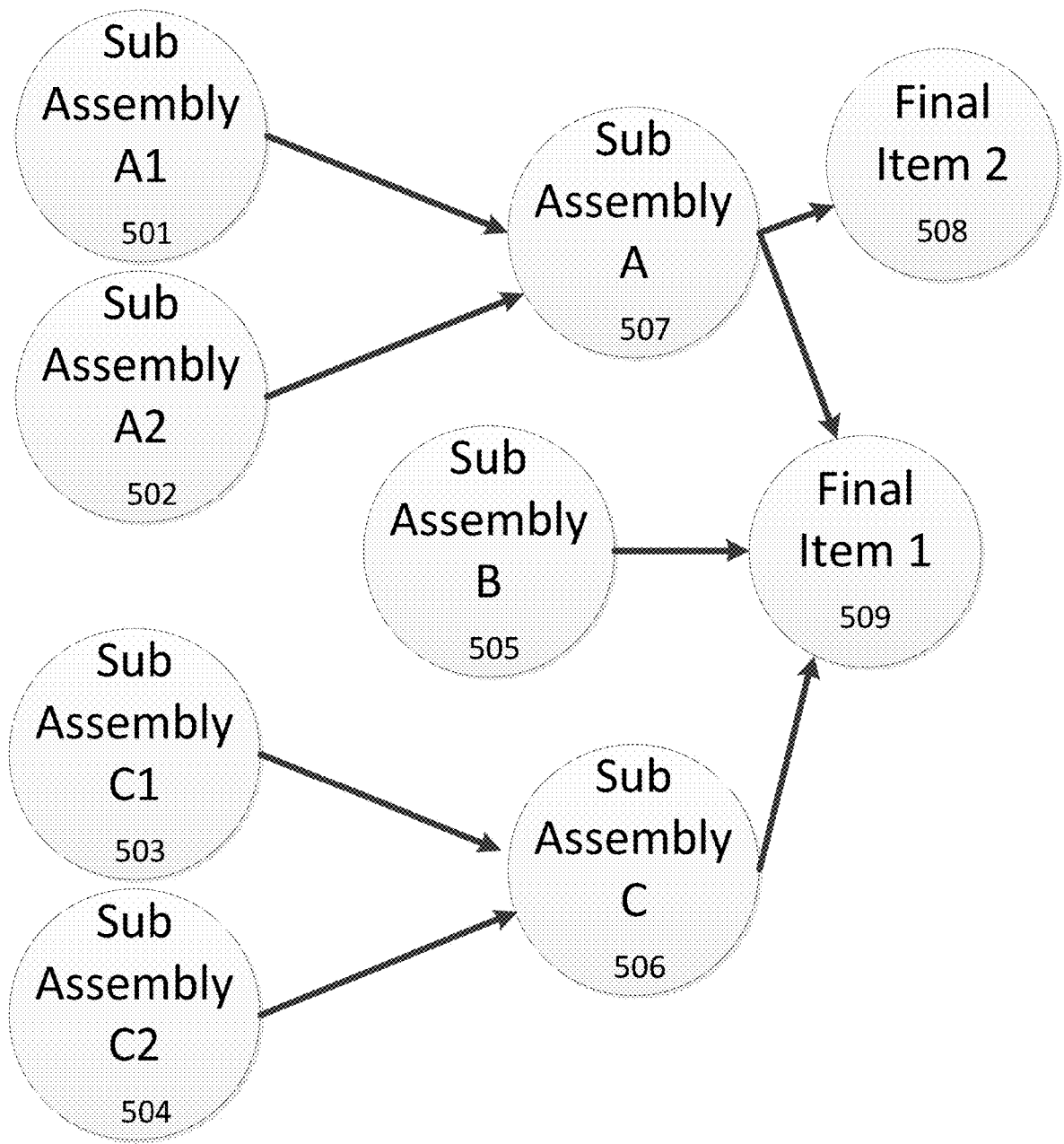
FIG. 5 shows a block diagram of General Item Decomposition.

FIG. 5 shows a block diagram of General Item Decomposition. FIG. 5 presents the general idea behind the Aligned System, which essentially comprises decomposition, or breaking down large items into smaller items until the elemental items are determined. The system further comprises allowing creating of a tree, wherein resources can be assigned along with time estimates. Preferred embodiments of the system comprise means for allowing decomposition, tree creation, and resource allocation dynamically and asynchronously. Preferably, real time results are calculated, and each action is stored for later post mortem feedback. Note the above diagram is a flattened netlist of an Aligned Project;

the plans have been left out to emphasize the true nature of the netlist. The plans act as containers for items, to allow for organization and inheritance.

Figure 6:
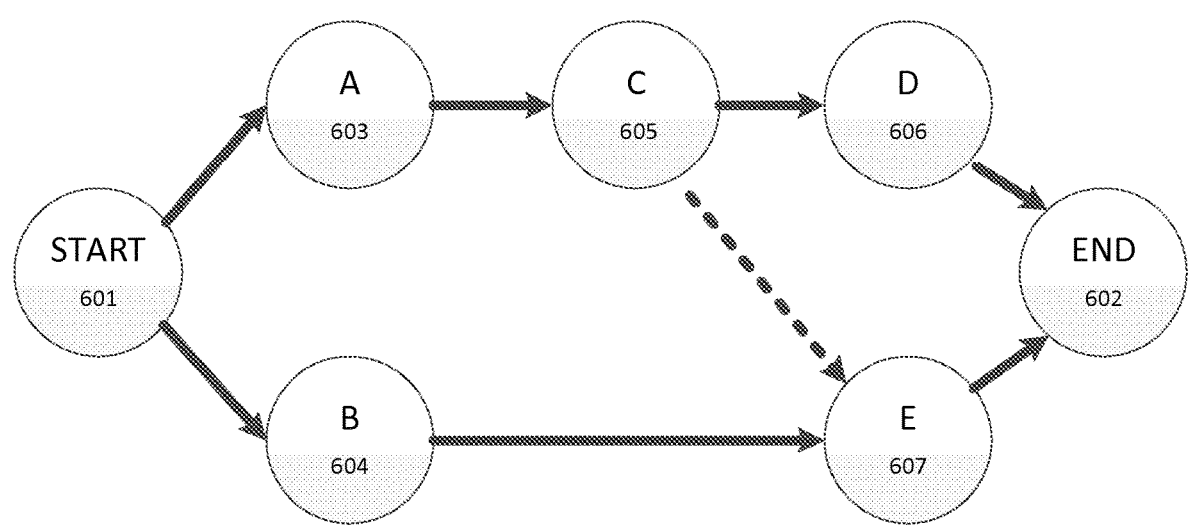
FIG. 6 shows a block diagram of the PDM from the PMBOK Guide.

FIG. 6 shows a block diagram of PDM PSTN from PMBOK Guide. FIG. 6 presents the Precedence Diagramming Method which is defined in "A Guide to the Project Management Body of Knowledge" otherwise known as the PMBOK Guide (Third Edition, pages 132-133). The purpose of the method is to construct a project schedule network diagram. The diagram is then intended to be used to monitor the progress of the project. The PDM is only given two pages in a book that is 390 pages long. In practice, the PDM is not used by project managers, and its construction is not emphasized by modern day tools such as Microsoft Project. The PDM can be considered as a subset of a GANTT chart, but this author feels that the requirements of time on the X-axis of the GANTT chart makes the two diagrams very different.

The PDM is a method used to construct a set of nodes interconnected with edges in typical mathematical graph form. The edges indicate dependencies. There is a distinct begin and end for the graph. According to the PMBOK guide, the nodes represent 'activities' which imply a noun, a verb, a task or an action. This collection of nodes, edges, a begin and end is referred to as a project schedule network diagram (PSND).

The PMBOK guide also refers to a sub network, which sub networks can be combined to make a PSND. The PMBOK guide does not indicate if a sub network located within a larger PSND would contain a begin and end object.

The summary of this method is that the project is a collection of actions, and by creating dependencies between these actions, a manageable project schedule network diagram can be constructed.

The problems with this method include: reusability not addressed, compliance not addressed, planinheritance not addressed, item inheritance not addressed. There is no method for managing PSND accuracy over time, no method for reusing PSND or sub network in sequential projects, no method for reusing PSND or sub-network in current project, no method for integration of compliance knowledge into PSND, no consistent rules regarding identification of items by type, and no consistent rules regarding identification of items by a particular instance.

Figure 7A:
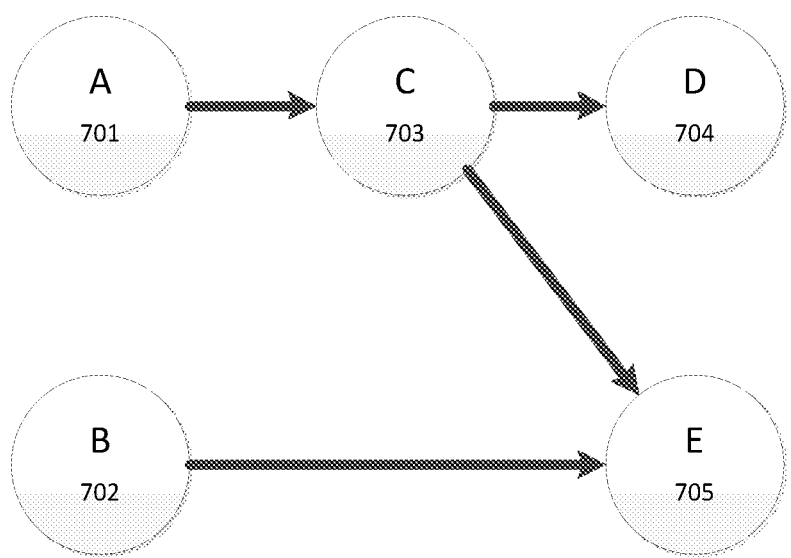
FIG. 7A shows a block diagram of Aligned Plan Equivalents to PDM.

FIG. 7A shows a block diagram of Aligned Plan Equivalent to PDM PSTN. As a result of the PDM not addressing compliance, reusability and inheritance of plans, a new paradigm shift must occur to accommodate these features. That new paradigm is the Aligned Diagram Methodology, or ADM.

While visually there may not be much difference in a small PSND between the PDM and ADM, as the projects scale upwards, the manageability of the PDM PSND falls apart quickly. There are several things to note about the difference between the PDM resultant PSND and the ADM resultant PSNDs as they scale upwards.

The ADM PSNDs are hierarchical, meaning that they can use composition to add plans within a plan. Additionally any plan type within the hierarchy can be inherited from another plan. Likewise, any item type within the hierarchy can be inherited from another item.

The "Tackle" is the canvas upon which the ADM PSND is drawn. The tackle also has management duties, it stores information such as variable scope, and complex data associated with the variables.

There can be multiple Tacklesthat represent different aspects of the same project, and all can use the same types as well as instances. This avoids the need for a large network diagram to capture all activity within a Project; the user can focus on what is relevant to their context.

Some of the major features of the ADM PSND are:

1. The ADM PSNDs are drawn on a "Tackle" which is a canvas that has special features for the ADM process. There is no uniqueness with regards to the PDM PSND's canvas; it is just a blank page.

2. There is no beginning and end on a plan as in PDM. Aligned Plans are constructed for input items and output (resultant) items. The reason for this is the following: a. The aligned plan is a type, or class. The plan class is instantiated as a plan instance in a Tackle to begin implementation, and to allow modification of the plan class. Plan classes can also be instantiated in plans; b. The plan may be included by a higher level plan as a child element. The inputs and outputs may or may not be connected to the higher level plan, or any parent plan in the hierarchical tree of the current Tackle; c. The begin and end in the PDM implies that the plan is complete and the plan may start and end. The Aligned plan does not imply a time or resources either human or material since it is a template consisting of items. When the plan is instantiated in a tackle, then the plan becomes actively implemented.

In a preferred embodiment, the plan has the capability of being inherited from, by a method called "Perfecting" the plan. An inheritance tree of plans can be constructed. Each time a plan is perfected, a new child plan is created that contains all the elements of the parent plan. The child is constantly linked to the parent, so that if the parent changes, the child is updated automatically.

Plans can be instantiated within other plans, similar to the sub network idea from PMBOK, but plans are specific containers that are not defined in PMBOK. The plan name defines the type name, and must be unique within a namespace.

The plan nodes contain item information. Tasks, algorithms and methods of work are assumed to be part of delivery of a node. An analogous way to think about this is that each node contains a noun whereas a PDM implies a verb. The PMBOK describes each node as an "Action Node" or "Task" implying a verb.

Plan is a type, which can have an inheritance chain of types. With this feature, statistics on Plans can be gathered by type.

The Item requires that complex data is associated within the node as part of the class definition, or as part of the instantiation.

The Aligned Plan requires instantiation in a Tackle to be used. Until that point, the Plan is analogous to a template or a software class. The PDM plan can be used immediately as is, there is no concept of instances.

An embodiment includes a computer automated system for planning and scheduling, comprising a processing unit coupled to a memory element and having instructions encoded thereon, wherein the encoded instructions cause the system to: connect to a single of plurality of similar computer systems via a local, private, or public network; and wherein the encoded instructions cause the single or plurality of computer systems to: create or instantiate a plan, wherein the said plan is comprised within a tackle, and wherein the plan comprises a single or plurality of recursive child plans, allowing for organization, linking, interfacing and inheritance of a plurality of plans, a single or plurality of items, and for organization, linking, interfacing and inheritance of said items; perform an operation or operations on each item wherein each item can be broken up, perfected, integrated, or tackled; and wherein the encoded instructions further cause the computer system to: request assignment through a series of assigning users, with the final assigning user assigning the first item to a first user who commits to the assignment of the first item; wherein the first user commits to constructing the item by providing a commitment duration range of time, becoming the assigned user; deliver the constructed item by the assigned user to one or more receiving users; accept or reject the delivered constructed item by the one or more receiving users; record and store critical analytics with respect to construction of the assigned item and its' delivery relative to the specified duration range; and modify given protocol between users.

According to an embodiment, the breaking of each item further comprises breaking the item into smaller items optionally with plans until the elemental items are determined. The breaking of each item further comprises a means for allowing decomposition, tree creation, and resource allocation dynamically and asynchronously. Additionally, the system is further caused to calculate a result for the said breaking of each item, in real time. Further, the system can be caused to construct a set of nodes interconnected with edges in a mathematical graph formwherein the edges indicate dependencies, and wherein the mathematical graph form further comprises a local starting point or points and a corresponding local ending point or points, that may be linked, instantiated or cloned. The nodes represent 'items' or 'activities 'which imply a noun or verb, task or an action.

According to an embodiment, the encoded instructions cause the system tocreate a data structure or structures comprising means for storing a single or plurality of information types for and relevant to an interaction subsequent to creating an item or items, wherein the data structures are comprised in a simulation algorithm that comprises a means to provide real time statistical updates; and wherein the information type comprises at least one of images, video, audio, and textual data. Additionally, the system is caused to combine statistical data of events that have occurred, with metrics of results of algorithms which offer possibilities of future events such that the combination of past, present, and future predictive data from algorithmic sources enables processing each tackle in the context of algorithms applied. Further, structural diagrams of Tackles, Plans, Items and Edges, can be coupled with Interaction Diagram protocols and data, to generate past and current analytics, and project future analytics in the form of statistics. Preferably, a predictive algorithm based on User history and Project History, is used to generate future analytics in the form of projected statistics.

According to an embodiment, a duration range request for an item or plan is received by the system; based on the context and history of the item or plan, calculate the duration distribution is calculated, and in response to the received duration range request the calculated duration distribution is returned.

Another embodiment includes, in a computer automated system comprising a processing unit coupled to a memory element and having instructions encoded thereon, and connected to a single or plurality of similar computer systems over a network, a method for planning and scheduling, comprising: allowing the creation or instantiation of a plan, wherein the said plan is comprised within a tackle, and wherein the plan comprises a single or plurality of recursive child plans, and further allowing for the organization, linking, interfacing, and inheritance of said plans, and organization, linking, interfacing and inheritance of a single or plurality of items; performing an operation or operations on each item wherein each item can be broken up, perfected, integrated, or tackled; and wherein the method further comprises: requesting assignment through a series of assigning users, with the final assigning user assigning the first item for a first user who commits to the assignment of the first item; wherein the first user commits to constructing the item by providing a commitment duration range of time, becoming the assigned user; delivering the constructed item by the assigned user to one or more receiving users; accepting or rejecting the delivered constructed item by the one or more receiving users; recording and storing critical analytics with respect to construction of the assigned item and its' delivery relative to the specified duration range; and modifying given protocol between users.

Preferably, the breaking of each item further comprises breaking the item into smaller items until the elemental items are determined. The breaking of each item further comprises a means for allowing decomposition, tree creation, and resource allocation dynamically and asynchronously. Preferably, the method comprises calculating a result for the said breaking of each item, in real time.

According to an embodiment, the method further comprises: constructing a set of nodes interconnected with edges in a mathematical graph form, wherein the edges indicate dependencies, and wherein the mathematical graph form further comprises a local starting point or points and a corresponding local ending point or points, that may be linked, instantiated or cloned. The nodes represent 'items' or 'activities' which imply a 'noun' or verb, task or an action.

According to an embodiment, the method comprises creating a data structure or structures comprising means for storing a single or plurality of information types for and relevant to an interaction subsequent to creating an item or items, and wherein the data structures are comprised in a simulation algorithm that comprises means to provide real time statistical updates. The information types comprise at least one of images, video, audio, and textual data.

Additionally, the method comprises combining statistical data of events that have occurred, with metrics of results of algorithms which offer possibilities of future events such that the combination of past, present, and future data enables processing each tackle in the context of algorithms applied. Structural diagrams of Tackles, Plans, Items and Edges, are coupled with Interaction Diagram data, to generate past and current analytics in the form of statistics. Subsequent to the said coupling, a predictive algorithm is used, based on User history and Project History, to generate future analytics in the form of projected statistics.

According to an embodiment, the method comprises receiving by the computer system, a duration range request for an item or plan. Based on the context and history of the item or plan, the system calculates the duration distribution and returns the calculated duration distribution in response to the received duration range request.

Figure 7B:
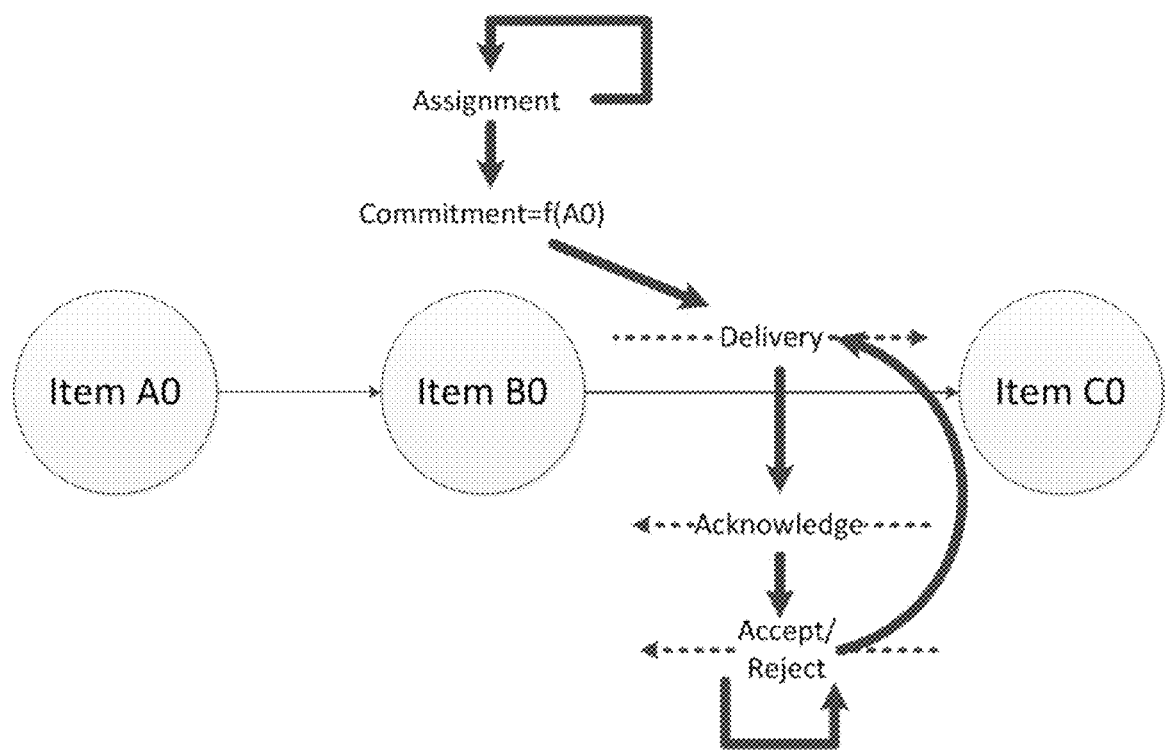
FIG. 7B illustrates an interaction diagram 'base methodology" or 'base protocol' in terms of users.

FIG. 7B illustrates an interaction diagram 'base methodology" or 'base protocol' in terms of users. According to an embodiment, the graph, represented by Item A0, Item B0, and Item C0 and the edges that connect them, are loosely connected to the Item Interaction Diagram states given by Assignment, Commitment, Delivery, Acknowledge, and Accept/Reject. Further, the interaction diagram data structures are tied to an instance of an item in a tackle, not to the item itself. Preferably, the interaction diagram data structures are tied to one item only. The dotted edges indicate actions between owners of the items on the graph.

According to an embodiment, an item may be assigned through a chain of people; for example, from president to vice president, to director, to manager, to employee. Essentially, a plurality of users can be involved in the assignment. On/in any state, the item interaction diagram can be 'abandoned' by a current user. The assignment is accepted by a user via a commitment, which is a range of duration. The range of duration is an estimate of time. The duration is calculated by the user giving the duration, based on dependent items. In the example, the duration range of B0 is calculated based on Item A0's delivery. Once an item is delivered, it is delivered to the user who committed to a duration range for Item C0. The Item C0 owner receives delivery notification. When Item C0 owner receives delivery, an acknowledge notification is generated for Item B0 owner to notify that the downstream owner is aware of the delivery. After the delivery of Item B0 has been analyzed for quality by the owner of Item C0, the owner of Item C0 either accepts or rejects the delivery. If accepted, work on Item C0 begins. If rejected, a request is generated to re-work part or all of Item B0. This process may repeat with regard to accept/reject, and an acceptance might turn into a later rejection. As the interaction diagram is configurable, an alternate embodiment might involve a third party for evaluation of the deliverable. An owner or owners can be of several types. Embodiments disclosed include Multiple Assignment owners, Commitment owners or/and delivery owners (the same), Acknowledge, accept, and/or reject owners (the same). In alternative embodiments all the aforementioned owners can be the same.

In an example embodiment an assignment is requested from a "Previously Assigned User" to "Currently Assigned User". This may happen repeatedly. At this point the Item Interaction State is considered "Unaffiliated". The "Currently Assigned" user has the option of Assigning the item to another user, or accepting the item assignment and becoming the "Item Owner". The Item Interaction State becomes "Uncommitted". The Item Owner commits to the item by providing a commitment duration range of time to indicate how long it will take to complete the item. At this point the user is still the "Item Owner", but the Item Interaction State changes from "Uncommitted" to "Committed". The Committed Item may be rejected by a member of the project. Once the dependencies for the Item have been delivered to the Item Owner by "Upstream Owners", and the Item Owner has acknowledged receipt of the deliveries, and accepts the deliveries, work begins on the Item. The Item Interaction State changes from "Committed" to "In Progress". Once work is completed on the Item, critical analytics are stored regarding when the item was delivered relative to the duration range specified in the commitment. "Downstream Item Owner", that is Item Owners of Items that depend on this Item, will be notified that their delivery is ready. The Item changes from "In Progress" to "Delivered". Each Downstream Item Owner will acknowledge receiving the delivery notice of from Item Owner. Further, each Downstream Item Owner will either accept or reject the Item Owner's delivery of the Item. If accepted, the Item Interaction State will change to "Accepted". If rejected, the Item Interaction State will change to "Rejected". There is a lot of room here for alternatives, problem resolution, and in-betweens, as will be apparent to a person having ordinary skill in the art. Note also, that analytics are stored on every step of the interaction diagram methodology, preferably automatically by the system.

Figure 8:
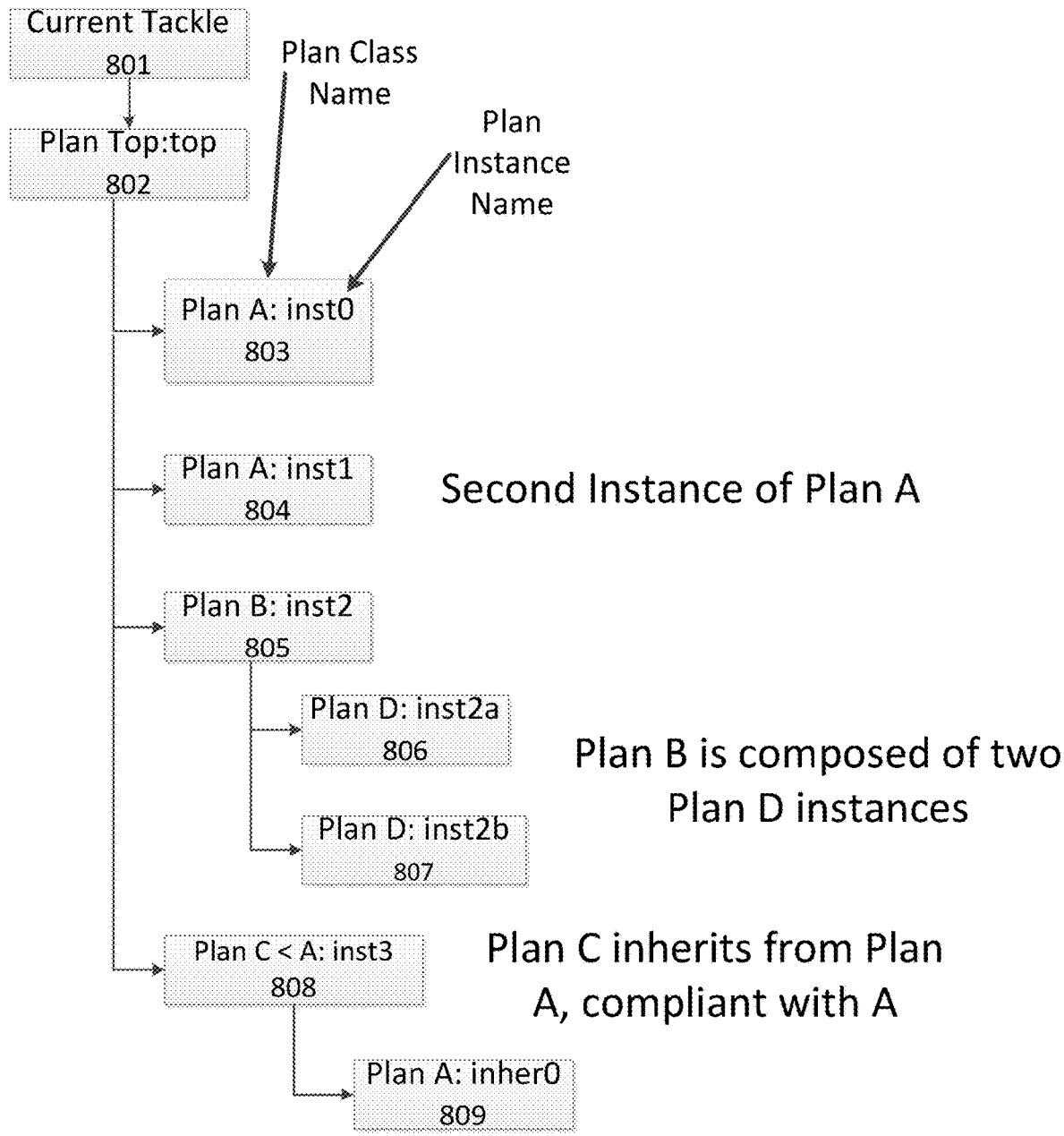
FIG. 8 gives an example Tackle, comprising a hierarchy of Plans that have been placed within the Tackle. The Figure shows how Plans are stored, instantiated, and also depicts an example of Plan Inheritance.

FIG. 8 shows a block diagram of the relationships between the tackle and plans, the relationships between plans exhibiting inheritance, aggregation and composition. The block diagram also shows how compliance is handled through inheritance. Alternative embodiments could handle compliance through aggregation or composition, or a "has and belongs to many" approach. The "has and belongs to many" approach could also be used when adding plans to a tackle, or to other plans.

Current Tackle 801 is an object of type Tackle. The Tackle is a container of plans, but alternative approaches may include items in the Tackle. The Tackle contains unique identifiers for each object so that each object can be identified uniquely in a simulation algorithm. The Tackle can be implemented with a containing algorithm, or an algorithm strategy can recognize the type of Tackle to de-couple the Tackle/Algorithm classes. In any algorithm, simulator, optimization of path, or data mining, the interface is generic as a container of plans, items, and supporting items such as labels, community data, and metrics. The Tackle is the view of the implemented Plan, which becomes active when the first plan or item is placed on the Tackle object. Note that the same plan could appear on different Tackles and have a different view depending on how the Tackle chose to display the plan data. This could vary based on what is important to the plan on a given date, or dependent on the particular user that is viewing the plan. The tackle may respond differently to an executive than an hourly employee, but the information in the model may be the same. The view builders are not pictured in this diagram.

Plan Top: top 802 is an object of type Plan and of type Top. The instance name of this particular plan is 'top' lowercase. The Plan 'top' is placed in a Tackle that is only referred to as the Current Tackle. This particular Plan object contains four Plan instances—Three of Plan type 'A', one of type "B", and one of type "C". Note that Plan Type C inherits from A, so while there are only four instances, the number of classes contained is five. Plan 'top' instantiates Plan of type "A" twice—one with object identifier 'inst0' and one with object identifier 'inst1'. The two instances of Plan A have the same structure, but may have different data placed on them just as standard programming languages support. The data may be placed by a scope or a lookup table, but is stored by the Tackle. The user can change what Tackle data source is used for the Plan Instance. As an example, the top level construction of a set of items might be dependent on three facilities, which would reside in a tackle. Each facility may have its' own tackle, wherein the top level construction links each tackle to the plan instance that represents each facility. After the facilities deliver, the top level might provide additional assembly, which would be managed by the local tackle.

Plan A: inst0 803 is an object of type Plan and of type A whose identifier is 'inst0'. The parent of inst0 is Plan Top: top. This object shows basic aggregation or composition. This Plan type does not have child plans.

Plan A: inst1 804 is an object of type Plan and of type A whose identifier is 'inst1'. The parent of inst1 is Plan Top: top. This object shows basic aggregation or composition. This Plan type does not have child plans.

Plan B: inst2 805 is an object of type Plan and of type B whose identifier is 'inst2'. The parent of inst2 is Plan Top: top. This object shows basic aggregation or composition. This Plan type does have child plans, two, both of Plan type 'D'. This shows that plans can recurse as long as the chain of recursion does not contain the same plan.

Plan D: inst2a 806 is an object of type Plan and of type D whose identifier is 'inst2a'. The parent of inst2a is Plan B: inst2a. This object shows basic aggregation or composition. This Plan type does not have child plans.

Plan D: inst2b 807 is an object of type Plan and of type D whose identifier is 'inst2b'. The parent of inst2a is Plan B: inst2b. This object shows basic aggregation or composition. This Plan type does not have child plans.

Plan C<A: inst3 808 is an object of type Plan and of type C and of type A whose identifier is 'inst3'. The parent of inst3 is Plan Top: top. This object shows basic aggregation or composition. This Plan type does have child plans through inheritance of A, but does not have child plans through aggregation or composition.

Figure 9:
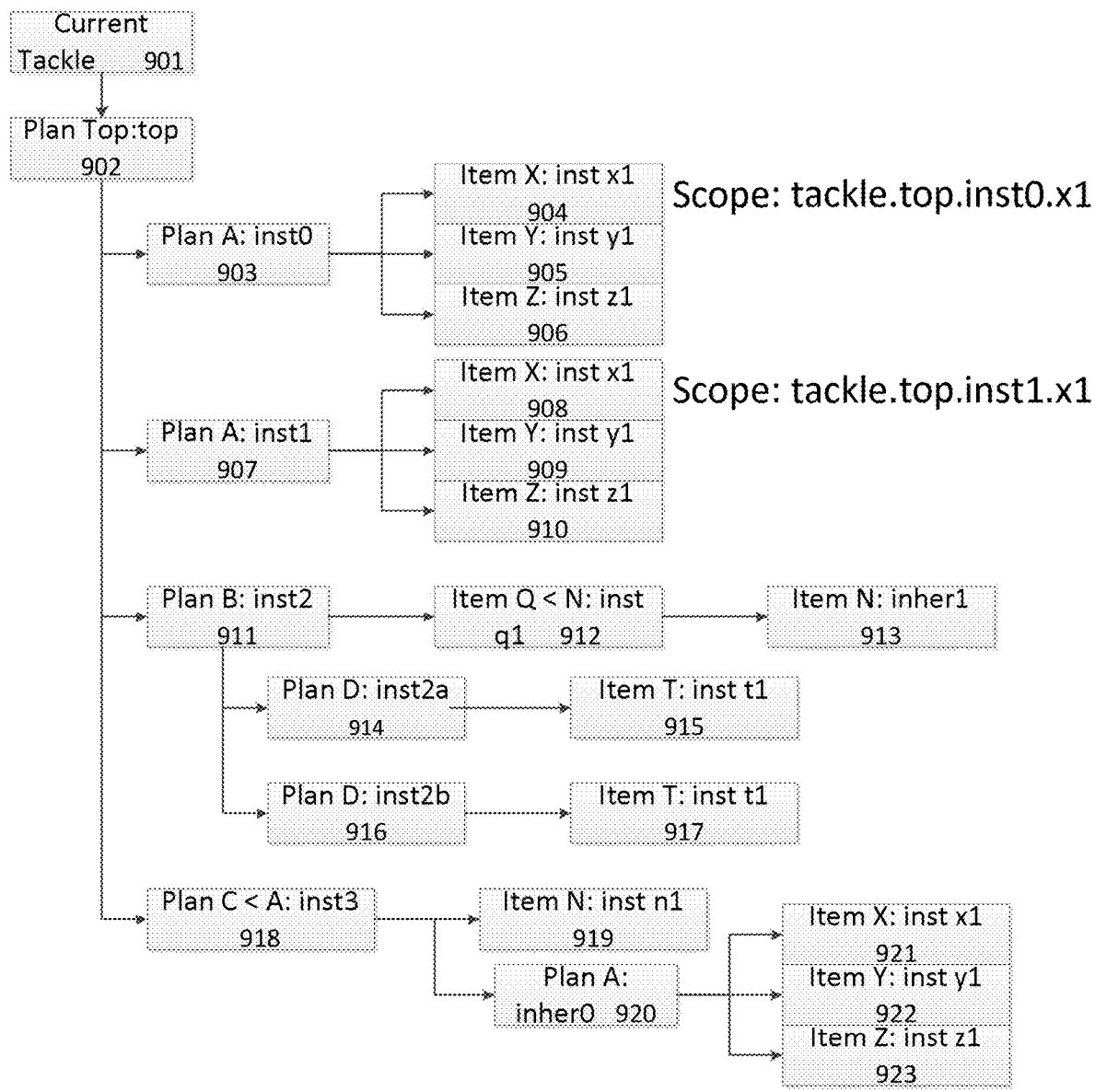
FIG. 9 adds to the FIG. 7, adding Items in the same manner. In the example, Item Q Inherits from Item N.

FIG. 9 shows a block diagram which extends FIG. 8 to include Items and shows similar features that were exhibited in FIG. 8, but this time for Items instead of Plans. Inheritance, aggregation, and composition apply to Items just as they do Plans.

901 is equivalent to 801.
902 is equivalent to 802.
903 is equivalent to 803.
907 is equivalent to 804.
911 is equivalent to 805.
918 is equivalent to 808.
920 is equivalent to 809.
914 is equivalent to 806.
916 is equivalent to 807.

Item X: inst x1 904 is an object of type Item, of type X. The identifier is named x1. The parent Plan of this item is Plan A. Items are similar to plans in their data structure, except that they cannot store Plans or Items. Items can be converted to Plans. Plans can be converted to Items if the child elements are lost.

Item Y: inst y1 905 is an object of type Item, of type Y. The identifier is named y1. The parent Plan of this item is Plan A.

Item Z: inst z1 906 is an object of type Item, of type Z. The identifier is named z1. The parent Plan of this item is Plan A.

Item X: inst x1 908 is an object of type Item, of type X. The identifier is named x1. The parent Plan of this item is Plan A, but its' object parent instance is inst1 instead of inst0. The data stored on 908 will vary from the data stored on 904.

Item Y: inst y1 909 is an object of type Item, of type Y. The identifier is named y1. The parent Plan of this item is Plan A, but its' object parent instance is inst1 instead of inst0.

Item Z: inst z1 910 is an object of type Item, of type Z. The identifier is named z1. The parent Plan of this item is Plan A, but its' object parent instance is inst1 instead of inst0.

Item Q<N: inst q1 912 is an object of type Item, of type Q and of type N through inheritance. The identifier is named q 1.

Item N: inher1 913 is an object of type Item, of type N. The identifier is named inher.

915 and 917 are structurally equivalent to 904 and 908, but illustrating that there is no limitation to the depth at which an Item can be placed.

Item N: inst n1 919 is an object of type Item, whose identifier is n1. Note that Item N has been added to the Plan type C as a subclass of type A.

921, 922, and 923 are structurally equivalent to 904, 905, 906 and 908,909, and 910, but illustrate that when a Plan is inherited, its' underlying structure is inherited as well, which is expected in a programming language.

Figure 10:
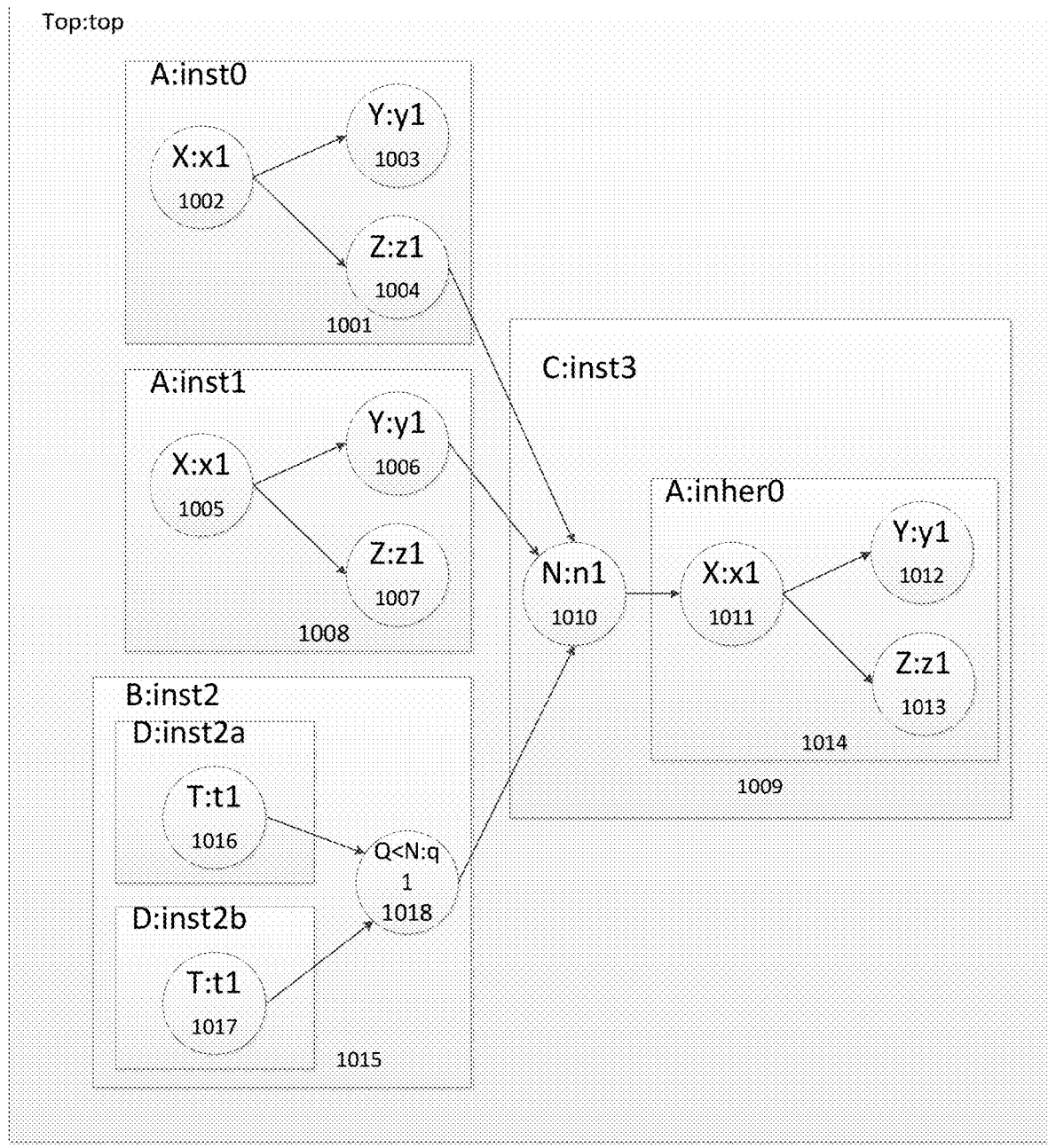
FIG. 10 shows what the PSTN might look like, making some assumptions about dependencies. The red highlights indicate element ownership by the Plan "Top" which is instantiated by the top level Plan. In this figure, the highlighted Edges are connecting Plans stitched together inside the top level Plan which is instantiated in the Tackle.

FIG. 10 is a possible view produced from the structural block diagram from FIG. 9. The view is a literal interpretation of FIG. 9, with local coordinates of each Plan Instance and Item Instance stored at the parent level of each object. The local coordinates are assumed to have a value within visible boundaries. FIG. 10 shows Edges, which show the dependencies of each Item.

Edge from 1002 to 1003, Edge from 1002 to 1004 both these show Edges that are stored within Plan A. Note that the Edges match the Edges in A: inst1 and A: inher0. These Edges are connected to siblings within Plan A and do not cross Plan boundaries.

Edge from 1005 to 1006, Edge from 1005 to 1007 both these show Edges that are stored within Plan A. Note that the Edges match the Edges in A: inst0 and A: inher0. These Edges are connected to siblings within Plan A and do not cross Plan boundaries.

Edge from 1016 to 1018 and 1017 to 1018 show Edges that connect Items from an Item source node that is at a lower level of hierarchy than the sink Item node. Note that the Edges would be stored in the first Plan that contains both their Item nodes, in this case Plan B.

Edge from 1010 to 1011 show an Edge that connects Items from an Item source node that is at a higher level of hierarchy than the sink Item node. Note that the Edges would be stored in the first Plan that contains both their Item nodes, in this case Plan C.

Edges from 1004 to 1010, 1006 to 1010, and 1018 to 1010 have Edges who the first Plan that contains both Item nodes is two levels above the node. There is no limit to the number of levels that an Edge can cross, either up, down, or both up and down in hierarchy. The first Plan that stores all nodes is Plan top.

Figure 11:
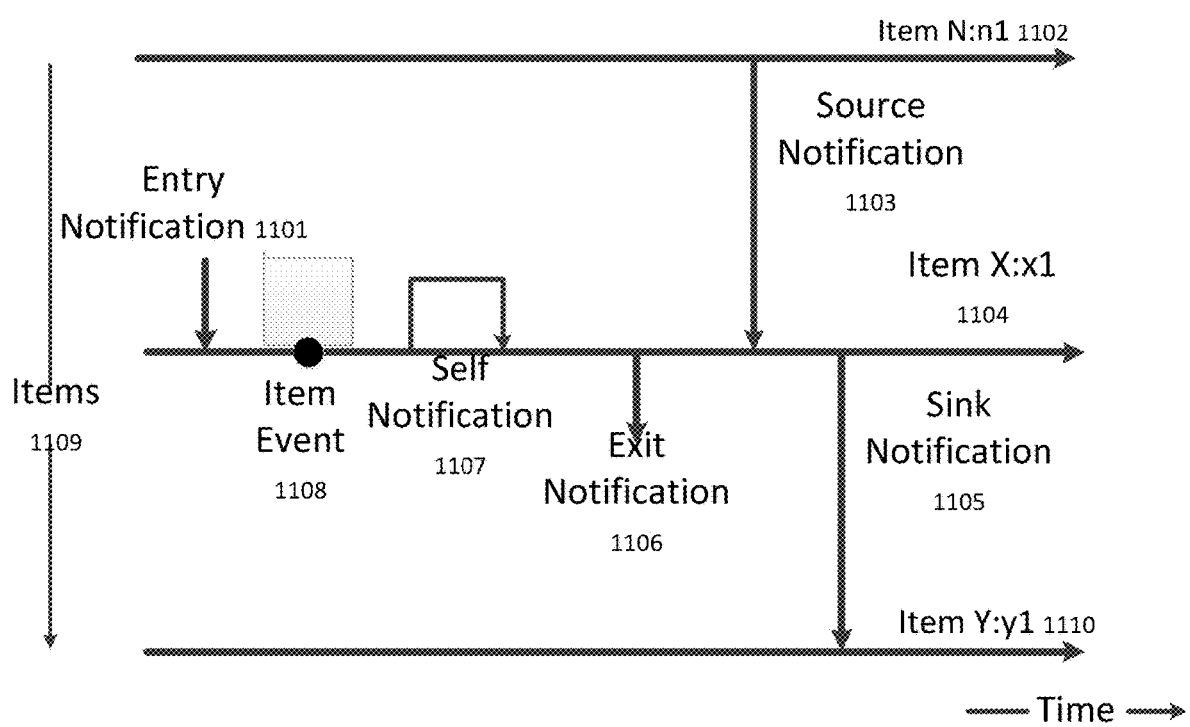
FIG. 11 shows a block diagram of Aligned Interaction Elements.

FIG. 11 shows a block diagram of Aligned Interaction Elements. FIG. 11 shows the potential types of notifications and events that can be used in the Aligned System. Notifications generally involve communication between two elements of the system. Complex data is attached to the notification, and each notification has a type. Notifications are classes, and can be modified and augmented.

Items 1109 occur in one time step, and store complex data. Item Events are classes, and can be modified and augmented.

Notification Detail—Note that notifications do not have to be initiated by a human being, they can be initiated by algorithms.

Entry Notification 1101—This is used to indicate to the item, or the item owner, that a notification needs to be processed. Some examples of this include: Assignment of item to a User, Message from a user about the item, Vote of confidence on the item.

Item Event 1108—This is used to indicate that a single event has occurred on the item's timeline. Some examples are: User accepts ownership of item, Duration of time for item to be completed is assigned by user.

Self Notification 1107—This is used to indicate that a notification is needed within certain time durations. Some examples are: A user is interrupted by another manager for a question, a user is removed from working on the current item, and a user is in a meeting.

Exit Notification 1106—This is used to indicate to another system element that there is data to be handled from the item or item owner. Some examples are: Item Delivered, Item Abandoned, Duration Changed, and Assignment Rejected.

Source Notification 1103—An item that is a dependency is indicating to the current item of focus that it needs to communicate. Some examples are: Item Delivered, Item About to be Delivered.

Sink Notification 1105—An item that depends on the current item of focus it needs to communicate. Some examples are: Delivery rejected, Constraint Violation.

Figure 12:
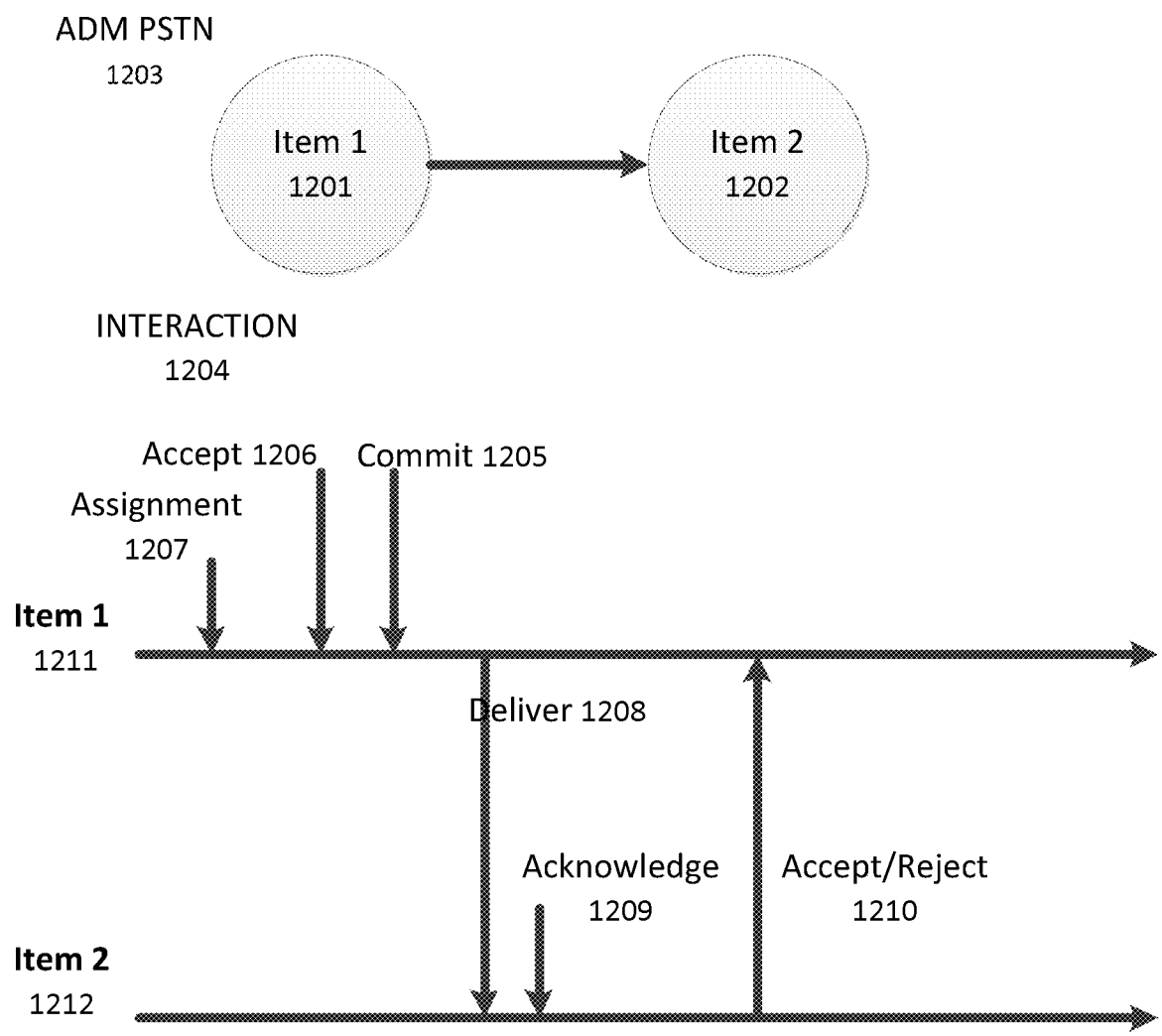
FIG. 12 shows a block diagram, in which an Interaction is shown between the owners of Item 1 and Item 2.

FIG. 12 shows a block diagram, in which an Interaction is shown between the owners of Item 1 1201 and Item 2 1202. This Base Methodology can be extended and modified to meet customer needs.

In the example, Item 2 depends on the completion of Item 1. The interaction steps are:

Assignment 1207—Item 1 1211 is assigned to a user.

Accept 1206—User accepts assignment of Item 1.

Commit 1205—User commits a duration, the amount of time it takes to complete Item 1, given dependencies are complete.

Deliver 1208—Once constructed, the item is delivered, within the Committed Duration.

Acknowledge 1209—the owner of Item 2 acknowledges that the delivery has been received. However, this says nothing about the quality of the delivery.

Accept/Reject 1210—Owner of Item 2 either Accepts or Rejects the Item 1 delivery.

The key point is that each action is stored, and can be analyzed at a later date, or used in a post mortem meeting.

Simulation

Simulation occurs when the structural data of Plans, Items and Edges contained within a Tackle are annotated with the data sourced from the interactive workflow. The Simulation is compiled continuously as a User adds structural and interactive data, as opposed to current techniques which require a build process. Simulation results are applied to a Tackle. Simulations can be affected by many Tackles. The goal of Simulations is to provide real time data for Statistics, or provide real time Analytic data for predictive behaviors.

Using FIG. 12 as an example for Simulation, Item1 1201 is required for Item2 1202. These structures would be laid down on a Plan in a Tackle. As the Items are created, data structures are created that store information for Interaction 1204. As Interaction 1204 progresses with Assignment 1207 taking place on Item 1 1211 Interaction line, the data of that event is stored, as is data with all subsequent events on each Interaction line. When Assignment 1207 occurs, another User viewing the same Tackle will view that an Assignment has taken place, because the Simulation algorithm is providing real time updates for Statistics, in this case Statistics for Assignments. The Item may change color, or add some extra icons to indicate that the Assignment has been made. The Statistics Simulation has access to this data, and can now process algorithms applied to the Simulation. For instance, an algorithm could be used that determines the effects if the assignment is changed to another User.

The Analytics portion is the combination of Statistical data of events that have occurred, and the metrics of the results of algorithms which offer possibilities of future events. This combination of past, present, and future data enables Users to process their Tackles in the context of whatever set of algorithms is applied.

Given the structural diagrams of Tackles, Plans, Items and Edges, and coupling it with Interaction Diagram data, past and current analytics in the form of statistics can be generated.

Given the structural diagrams of Tackles, Plans, Items and Edges, and coupling it with Interaction Diagram data, and then using a predictive algorithm based on User history and Project History the invention will be able to produce analytics in the form of projected statistics.

Analytics

Analytics consist of algorithms and data in terms of past, present and future given a specific access level. The general types of Data Analytics are:

Data generated from confidence from other users in the community for an element in the Interaction Diagram.

Data generated from previous events from a particular User.

Data generated from previous events from the interaction between two or more users.

Data generated from the modification of structural Plans, Items or Edges.

Data generated from properties annotated onto structural Plans, Items, or Edges.

Data generated from any run time property of the simulation.

Data generated from algorithms of a combination of the above Data.

Data is subject to access of that data. Data or algorithmic results may be dependent on the access associated with the data, or may not be, depending on the algorithm.

Algorithms may only use data from the past to provide results. Algorithms may use data from the past along with additional algorithmic functions to produce predictive data. Data from the future, although stored in the past, implies a piece of data that has predictive content associated with it.

Statistics

Statistics generally fall into several categories:

Standard Project information (projected end date, resource analysis, how much time did an item take to develop)

Linter Information (Errors in graph, User errors)

User Commitment Report (How well does the user make their commitments)

Type Reports (By type, what is the typical amount of time to implement)

Deviation Reports (Trends of change)

The most important of these are the User Commitment Report and the Type Reports; these are used to predict future development. If two sequential projects are completed for Item I, and item I takes 5 days each time, it's highly probable that it will take 5 days in the next project cycle.

Analysis

Figure 13:
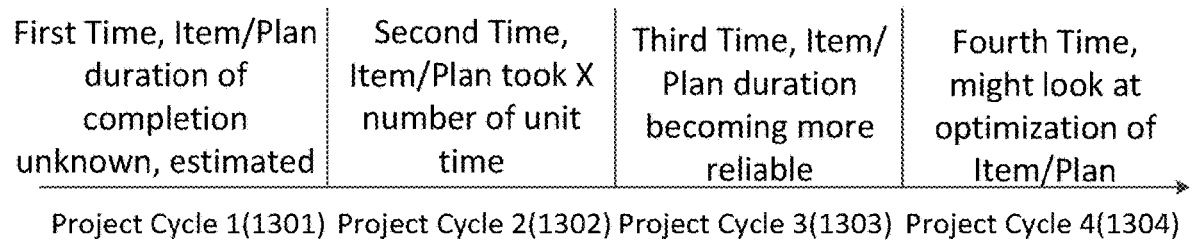
FIG. 13 shows the lifespan of an Item Type across multiple projects. As projects are repeated, information concerning individual Items and Plans increase; thereby allowing a user to more accurately predict the amount of time that Items and Plans will take to complete.

FIG. 13 shows the lifespan of an item type across multiple projects. As the projects are repeated, the amount of information about the Item or Plan increases, and thus the amount of time to develop it becomes more accurate.

The advantage of the Aligned System is that plans and items are strongly typed. This gives the ability to perform analysis as if the project has been implemented multiple times, even if the project is being performed for the first time.

Figure 14:
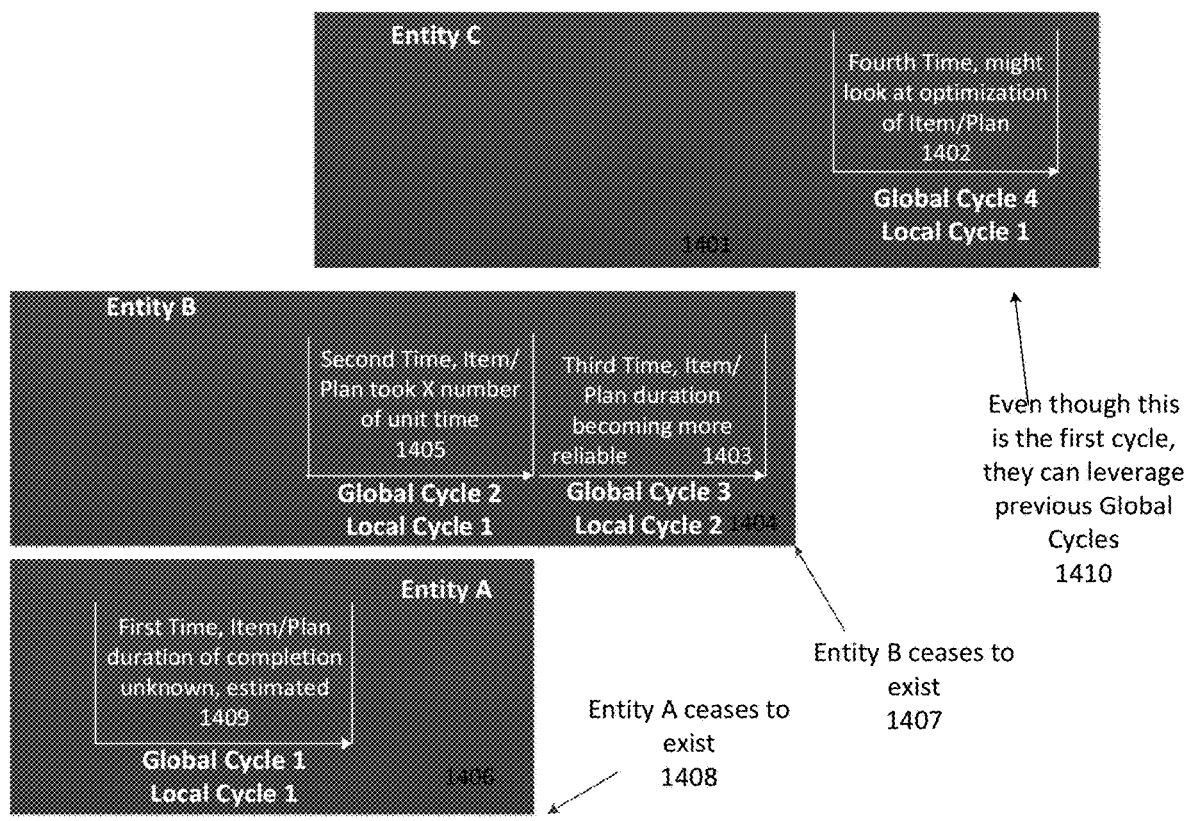
FIG. 14 shows an example where Entity C is performing a project for the first time. In the example, Entities A and B cease to exist, however, a user is still able to utilize prior analyses that were completed for Entities A and B. This look-back feature provides the benefit of allowing the user to selectively incorporate prior learned analyses from Entities A and B into the new Entity C.

FIG. 14 shows an example in which, Entity C is performing a project for a first time, but is able to leverage Analysis from Entities A and B, although Entities A and B no longer exist. In practice, projects will not match up exactly, but all the Item and Plan types in Entity C's project may have been accomplished in the past across multiple projects. The Local Cycle reflects the current implementer; the Global Cycle represents the previous number of attempts to create the item. Each item type will have its own distribution, the more accurately the item is described, and the smaller the duration variance will be. Therefore, this system creates incentive for users to become more accurate in their description.

Figure 15:
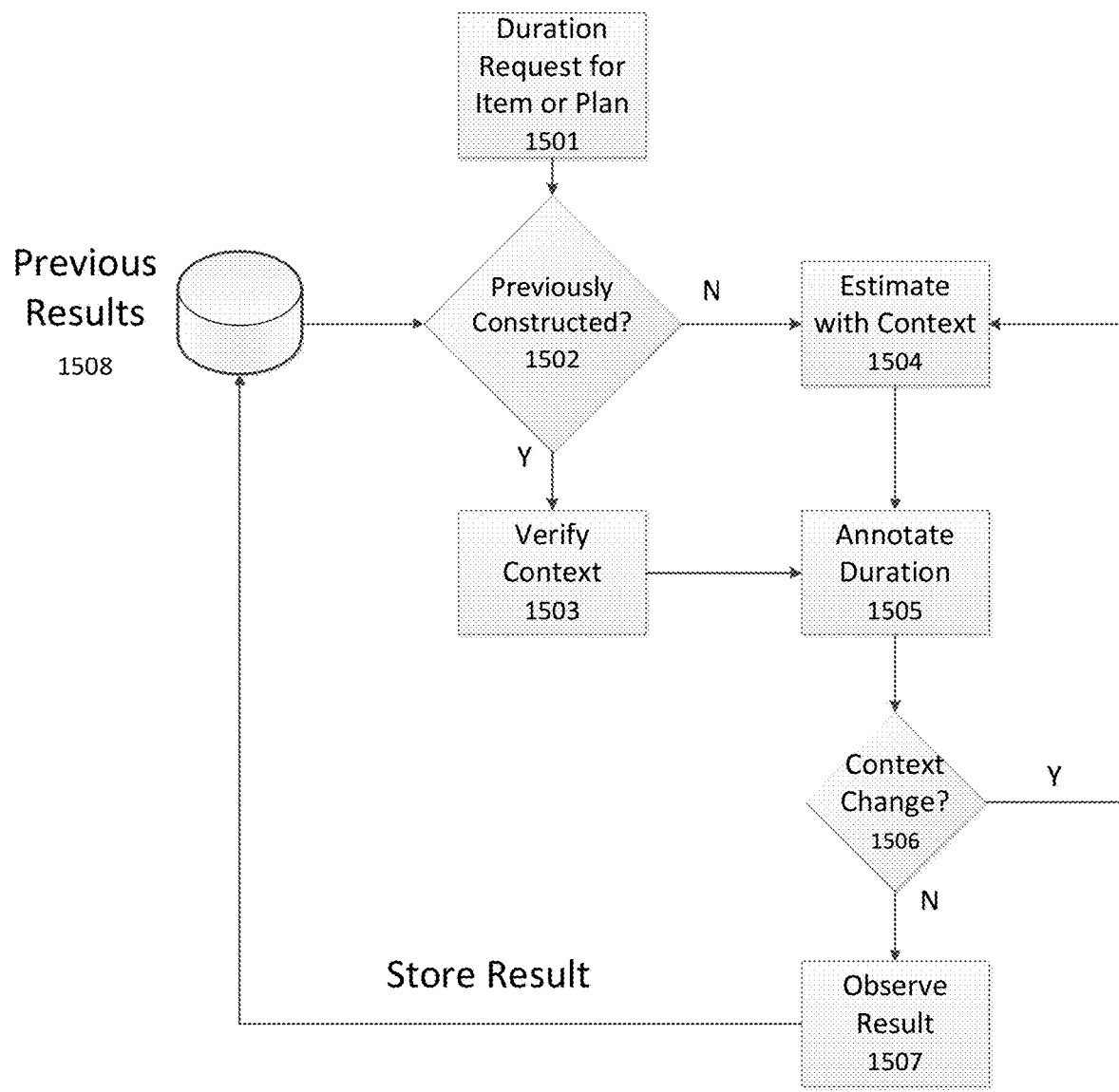
FIG. 15 shows a mechanism for analyzing Duration for an Item. The Figure also shows how Duration is applied to an Item.

FIG. 15 shows a mechanism for analyzing Duration for an Item. The Figure also shows how Duration is applied to an Item. In the Base Methodology, assignments once accepted are followed by a Commitment, which is expressed by a duration. If the Item is well understood, a duration can be provided for the given context—meaning for a given user, the amount of resource sharing, and other project factors. If there is no history, an estimate can be given by the user, or an estimate calculated from similarly type items. After the duration is assigned, if the context changes such as the user is transferred to a new manager, it may affect the duration, so the duration will be re-calculated with the new context.

Step 1501 indicates duration requests for an item or plan. The system then checks if the item or plan in question has a history, i.e. has it been previously constructed—step 1502. If the item or plan has in fact been previously constructed, the context is verified in step 1503. If on the other hand, the item or plan has not been previously constructed, an estimate may be received from the user, or, preferably, algorithms are used to calculate an estimate with similar items or plans as a reference point—step 1504. Based on the estimate, step 1505 annotates a duration. If within the annotated duration there is a change in context 1506, the context may be recalculated. At any rate once a result is obtained as in step 1507, it is stored in the database 1508 of previously obtained results.

The figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Some embodiments of the invention are implemented as a program product for use with an embedded processor. The program(s) of the program product defines functions of the embodiments (including the methods described herein) and can be contained on a variety of signal-bearing media. Illustrative signal-bearing media include, but are not limited to: (i) information permanently stored on non-writable storage media; (ii) alterable information stored on writable storage media; and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-accessible format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

The present invention and some of its advantages have been described in detail for some embodiments. It should be understood that although the process is described with reference to a system and method for scheduling that incorporates inheritance, feedback learning, path optimization, and simulation the process may be used in other contexts as well. It should also be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. A person having ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

What is claimed is:

1. A computer automated system for providing a platform for path optimization of one or more plans that provides guidance for establishing compliance of the one or more plans, the computer automated system comprising:

a plan database wherein the one or more plans are stored, each plan configured as a container having a structure that is decomposed into a plurality of nodes to form a network of nodes, each node to be executed for providing the guidance for establishing compliance of the one or more plans, the plurality of nodes associated with a plurality of items as deliverables, respectively, one or more processors that communicate with the plan database, the one or more processors configured to execute method steps of the platform, the method steps comprising:

a) decomposing a plan of the one or more plans into a first node, of the plurality of nodes, that relates to a request to create a first item of the plurality of items as a first deliverable and a second node, of the plurality of nodes, that relates to a request to create a second item of the plurality of items as a second deliverable, wherein the plan is decomposed into the first and second nodes absent a duration and an entity required for completing each of the first and second nodes;

b) linking first and second nodes so as to form a dependency between the first and second items based on an entity selection, the first and second nodes and dependencies thereby creating a decomposition data graph that is stored in the plan database;

c) assigning first and second entities to first and second nodes for creating the first and second items of the decomposition data graph, wherein assigning includes sending a request to the first and second entities to determine if the first and second entities are capable of creating the first and second items;

d) receiving commitment from the first and second entities to take action on the first and second nodes along with estimated durations from the first and second entities for completing the first and second nodes;

e) storing the commitment along with the estimated durations for completing the first and second nodes;

f) monitoring completion of the first and second nodes by the first and second entities, wherein monitoring includes measuring duration of execution of the first and second nodes;

g) performing a plurality of simulations associated with the first and second nodes;

h) storing results of the plurality simulations along with the durations of execution of the first and second nodes;

i) determining if the results are positive to thereby establish compliance of the plan; and j) upon completion of the first node, generating delivery notification from the first entity to take action on the first node and assigning a first identifier to the first item to identify it as the first deliverable and upon completion of the second node, generating delivery notification from the second entity to take action on the second node and assigning a second identifier to the second item to identify it as the second deliverable.

2. The computer automated system of claim 1 wherein the method steps further comprise storing the first identifier to identify the first item as the first deliverable and the second identifier to identify the second item as the second deliverable.

3. The computer automated system of claim 1 wherein the method steps further comprise delivering the first item as the first deliverable and the second item as the second deliverable for review.

4. The computer automated system of claim 1 wherein the first and second nodes are transformed into the first and second items upon completion of the first and second nodes.

* * * * *